US008152114B2

(12) United States Patent
Madsen

(10) Patent No.: US 8,152,114 B2
(45) Date of Patent: Apr. 10, 2012

(54) VERSATILE POLE SUPPORT, SYSTEM AND METHOD

(76) Inventor: Paul C. Madsen, Clifton, VA (US)

( * ) Notice: Subject to any disclaimer, the term of this patent is extended or adjusted under 35 U.S.C. 154(b) by 0 days.

(21) Appl. No.: 13/134,465

(22) Filed: Jun. 8, 2011

(65) Prior Publication Data

US 2011/0234795 A1 Sep. 29, 2011

(51) Int. Cl.
*H04N 7/18* (2006.01)
*F16M 11/00* (2006.01)

(52) U.S. Cl. ...................... 248/157; 340/10.42; 348/143

(58) Field of Classification Search .................. 248/157, 248/121, 122.1, 129, 149; 224/532, 504, 224/924; 242/594.4; 340/10.42; 348/143, 348/E7.085

See application file for complete search history.

(56) References Cited

U.S. PATENT DOCUMENTS

| | | | | |
|---|---|---|---|---|
| 4,987,976 | A * | 1/1991 | Daugherty | 187/243 |
| 5,090,667 | A * | 2/1992 | Harrell | 254/326 |
| 5,695,103 | A * | 12/1997 | Duvernay et al. | 224/532 |
| 6,070,926 | A * | 6/2000 | Hardin | 296/26.08 |
| 6,182,920 | B1 * | 2/2001 | Watkins | 242/594.4 |
| 6,252,764 | B1 * | 6/2001 | Benson | 361/625 |
| 6,820,723 | B2 * | 11/2004 | Huber | 182/127 |
| 6,948,587 | B2 * | 9/2005 | Griffiths | 182/20 |
| 2002/0134973 | A1 * | 9/2002 | Kozak | 254/325 |
| 2004/0240973 | A1 * | 12/2004 | Andrews et al. | 414/332 |

* cited by examiner

*Primary Examiner* — Anita M King

(57) ABSTRACT

An apparatus includes a lockable, adjustable pole support rail allowing a user to adjust a mounted pole to vertical on sloping terrain. The apparatus has multiple embodiments and useful applications, in that it can be attached to a vehicle's hitch receiver, or can be self-supporting utilizing fold-out stabilizing or attachable legs, for example. In addition, the apparatus may include wheels, thus permitting ease of transport to or from a vehicle. The pole can be deployed with a range of attachments or devices depending on the application. Exemplary applications include a photography camera, a surveillance camera, an infra-red camera, an antenna, loudspeakers, lighting equipment, signage, weather monitoring equipment, inspection equipment, and detection equipment.

14 Claims, 10 Drawing Sheets

VERSATILE POLE SUPPORT, SYSTEM AND METHOD

CROSS-REFERENCE TO RELATED APPLICATIONS

The present application claims the benefit of U.S. application Ser. No. 11/896,647, filed Sep. 5, 2007 and entitled "Versatile Pole Support, System and Method", which claims the benefit of U.S. application Ser. No. 60/842,813 filed Sep. 7, 2006 and entitled "Pole Support System," the specifications of which are incorporated herein in their entireties.

FIELD OF THE INVENTION

The present invention relates to a pole support system, and more particularly to a portable pole support system that can adapt to uneven terrain to provide a level support for a variety of items.

BACKGROUND AND SUMMARY OF THE INVENTION EMBODIMENTS

Poles are used to elevate devices or support a variety of equipment, ranging from communication applications to lighting. Portability of such poles has traditionally constrained wider applications for poles. One improvement in this area is the development of telescopic poles. However, for most telescopic pole consumers, raising a pole to elevation is a time consuming endeavor requiring thoughtful selection of terrain and careful attention to pole angle to obtain a near vertical pole orientation, thus allowing the user a maximum safe extension. For example, if a pole is improperly extended and is not vertical, a fulcrum effect exists which creates torque about its base. This torque presents a danger to the user and equipment due to possible mechanical failure of the pole or pole support. Many poles are height limited or use cumbersome guy wires to prevent high torque loads, thus reducing their usefulness.

Conventional telescopic pole systems suffer from a number of drawbacks. For example, one conventional type of pole support rigidly attaches a pole directly to a non-adjustable vehicle hitch or trailer. This approach cannot adapt to a sloping terrain. That is, the rigidness cannot be adjusted to a vertical orientation. In addition, a trailer mounted pole stabilizer, in general, is large and heavy, and thus, less easily transported and positioned. Further, a larger storage area is required for such a stabilizer. Additionally, a pole mounting plate has been utilized, whereby the plate is positioned under a vehicle wheel to provide a rigid base. This approach is impractical on sloping terrains because the pole assumes an angle perpendicular to the terrain.

There is thus a need for a device, system and/or method that provides a lightweight, compact, adjustable, fast erecting, vehicle mountable or self-supporting and easily transportable pole stabilizing method and apparatus that is capable of operating on uneven terrain.

The present invention provides, in part, a pole support and method that can adjust to a vertical position irrespective of the slope or grade of the terrain. The present invention further provides, in part, a dual pivoting pole support having members that can pivot about non-parallel axes so as to provide true, multi-dimensional leveling. The present invention further provides, in part, a pole mounting system for assisting in remote surveillance whereby a pole mounted camera or other device and multiple support parts can be directed by remote computer so as to adapt for local conditions without requiring personnel on-site. In addition, the pole support system may articulate to position the pole vertically, either automatically by leveling gyroscope or computer, or manually, whereby the operator uses an input device to send signals, which through actuators, manipulate the pole to a vertical orientation on sloping terrain.

Still other aspects, features, and advantages of the embodiments of the invention are readily apparent from the following detailed description. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings and in which like reference numerals refer to similar elements and in which.

DESCRIPTION OF THE PREFERRED EMBODIMENTS

Figure 1:
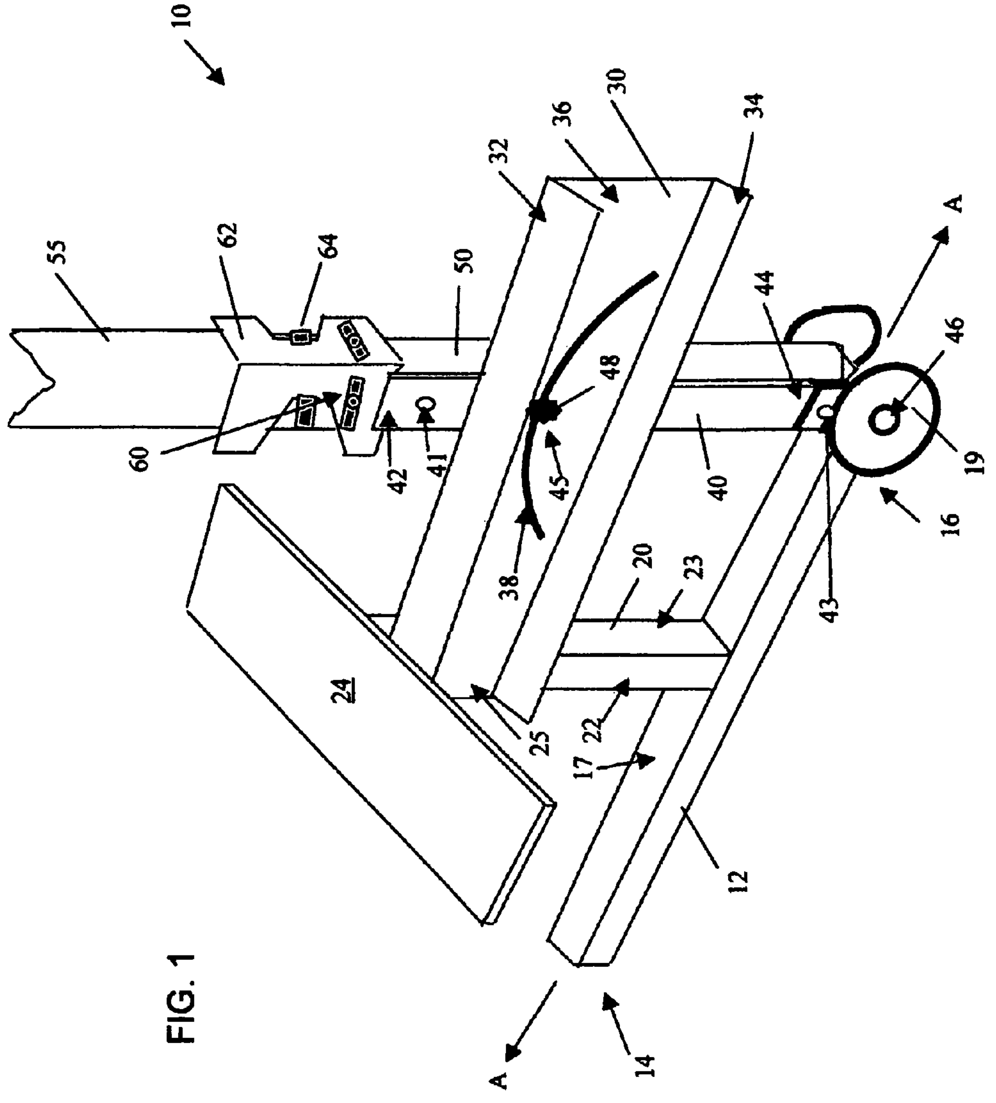
FIG. 1 is a right front perspective schematic view of one embodiment of the present invention.

An apparatus, method, and system for supporting a pole are disclosed. In the following description, for the purposes of explanation, numerous specific details are set forth in order to provide a thorough understanding of the embodiments of the invention. It is apparent, however, to one skilled in the art that the embodiments of the present invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a telescopic pole, it is recognized by one of ordinary skill in the art that the embodiments of the inventions have applicability to any type of physical structure that may be substituted for the pole (e.g., an antenna).

As shown in FIGS. 1, 2, 6, 7 and 11, one embodiment of the pole support 10 of the present invention includes a base support member 12 having a feed end 14 and a pole mounting end 16. The feed end 14 is adapted to be securable to a vehicle trailer hitch receiver in one embodiment of the present invention, and can be provided with one or more stabilizing supports that telescope from the end thereof. In this embodiment, the feed end 14 is provided in substantially rectangular or square form in cross-section so as to be easily secured to a vehicle trailer hitch receiver (not shown). The feed end can include bore holes 18 extending therethrough to facilitate pin-type retention of the base support member in the trailer hitch or similar retaining device. It is foreseeable that the feed end 14 can be constructed so as not to be substantially rectangular or square in cross-section so as to adapt to other mounting surfaces and equipment. Such embodiments can be provided either through machine forming of the feed end 14 or through providing a separate feed end member that is subsequently attached at a first end to the base support member 12 such as by mechanical bolt or welding means, for example. The pole mounting end 16 can be provided with wheels 19 to facilitate portability of the device of the present invention.

As further shown in FIGS. 1, 2, 6, 7 and 11, the base support member 12 extends from the feed end 14 to the pole mounting end 16 in a substantially straight direction. In one embodiment of the present invention, the base support member 12 ultimately rests in a substantially horizontal position in a plane just above the ground. A support tube member 20 is secured to the base support member 12 at a position between the feed end 14 and the pole mounting end 16, and the support tube member 20 extends in a substantially perpendicular direction from the axis A of the base support member 12. In the embodiment shown in FIG. 1, the support tube member 20 has a bottom end portion that is fixedly secured to an upper wall 17 of the base support member 12 by a spot or seam weld, for example. The support tube member 20 further includes a top end portion (not shown) that acts to support a platform 24. The support tube member 20 has a front facing wall 22 and a pole facing wall 23, wherein the front facing wall 22 supports a first end 25 of a pole guide and support member 30, as described more completely hereinafter.

As further shown in FIGS. 1, 2, 6, 7 and 11, the pole support 10 includes a pole mounting rail member 40 mounted to the base support member 12 at a position proximate the pole mounting end 16. The pole mounting rail member 40 comprises a substantially rectangular body having multiple openings near the top 42 and bottom 44 ends. A topmost opening 41 is provided just below the top 42 and can be used to receive a bolt or similar hardware element that can extend through the opening 41 and into a pole base 50 to help retain the pole 55 or other item being mounted in the pole support. A bottommost opening 46 is provided just above the bottom end and can be used to receive a bolt or shaft that extends through the opening 46 and the wheels, acting as an axle as well as a pivot point for the rail member 40. A secondary opening 43 proximate the lower end of the rail member can receive a separate bolt that can then extend into and be secured with the pole base 50. The pin, bolt, shaft or other item inserted through openings 41, 43 into pole base 50 act to join rail member 40 and pole base 50 such that movement of the rail member 40 also moves pole base 50. In one embodiment of the present invention, the shaft in opening 46 extends underneath the pole base. The pivot shaft 46 is mounted substantially perpendicular to the axis A of the base support member 12 so as to allow rotation of the pole mounting rail member 40 (and connected pole base) in a back and forth direction, such that the pole mounting rail member axis B can form an acute angle with the axis A of the base support member in one setting and an obtuse angle with axis A in another setting. It will be appreciated that various adaptations, including shims, can be inserted between the wheels and the rail member, or between the rail member and the pole base in order to provide a secure, stable, movable device in accordance with the desired aspects of the present invention.

A middle-area opening 45 is provided in pole mounting rail member 40 below the topmost opening 41 and above the opening 43 and is used to securely receive a lock knob 48 and bolt or similar device employed in connection with the pole guide and support member, described more completely hereinafter. By securing the pole mounting rail member 40 to the pole 55 using appropriate hardware that extends through the openings 41, 43 and into the pole 55 or pole base 50, the present invention allows the pole axis P to rotate with the axis B of the pole mounting rail member. Thus, when the pole mounting rail member 40 is adjusted back and forth using pole guide and support member, the pole rotates with it.

Figure 11:
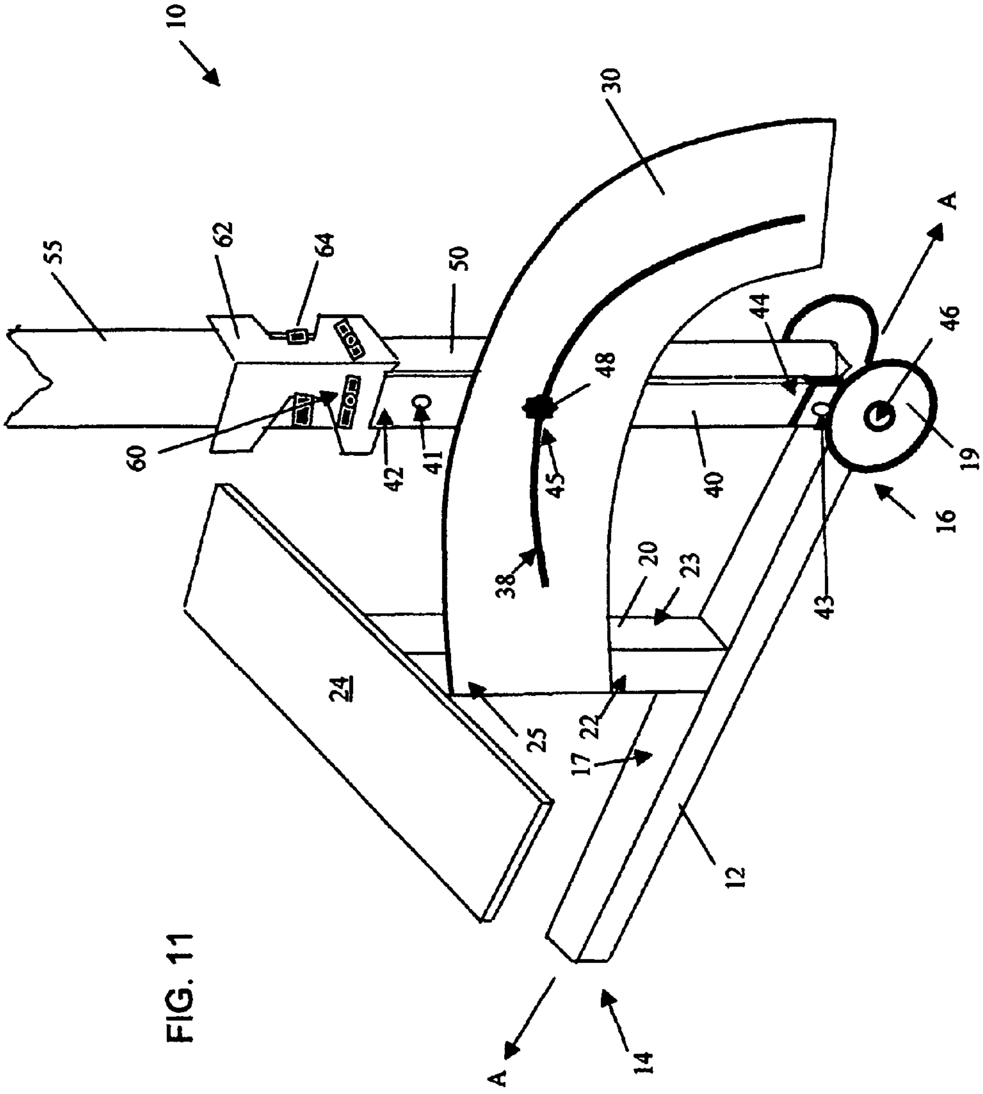
FIG. 11 is a right front perspective schematic view of an alternative embodiment of the present invention.

The pole guide and support member 30 is fixedly mounted at its first end 25 to the support tube member 20 as described above. Such mounting can occur, for example, by seam welds on either side of the front facing wall 22 of the support tube member 20. The pole guide and support member 30 also serves to support the platform 24, to which it may also be secured by a seam weld, for example. The platform 24 is provided to allow a user to stand at an elevated position to easily reach the top of the pole to engage and disengage equipment or devices, for example. The pole guide and support member 30 can be flat plate or channel shaped in cross-section having a top 32 and bottom 34 ridge joined by a substantially flat midsection 36. The pole guide and support member 30 is substantially parallel to the base member 12 in FIGS. 1-3. The flat midsection 36 can be provided with an arcuate slit 38 formed by cutting through the midsection. The pole guide and support member 30 and slit 38 can be extended in an arc fashion in order to accommodate aggressive terrain angles, as shown in FIG. 11. In this alternative embodiment, the slit is provided so as to permit rotation of the pole to ground level to facilitate mounting whatever device is desired atop or on the pole. In such an embodiment, it will be appreciated that the platform 24 may not be required. In such an embodiment, it will further be appreciated that, while portions of the pole guide and support member 30 are substantially parallel to the axis of the base support member 12, the pole guide and support member 30 also includes portions that are somewhat curved consistently with the arcuate slit 38 maintained therein.

With regard to materials and dimensions employed, it will be appreciated that the present invention can employ a variety of materials, such as steel or other metal in tubular or solid form, for example. Each of base member 12, support tube member 20, rail member 40 and pole guide and support member 30 can range from several inches in a diminutive embodiment to as many as ten feet in one embodiment. In a preferred embodiment, these elements are comprised of tubular (hollow) mild steel and each ranges from one to five feet in length, with the base member 12, support tube member 20 and rail member 40 being substantially square in cross-section with a width and height of approximately 1 to 6 inches.

A locking knob 48 or similar hardware device is positioned through the arcuate slit 38 and into the pole mounting rail member 40, and when tightened, maintains the pole guide and support member 30 in tight engagement with the pole mounting rail member 40, such that the pole mounting rail member cannot move fore and aft of the pole guide and support member 30. When the knob 48 is loosened, the pole mounting rail member 40 is then capable of traveling fore and aft to the full extent of the arcuate slit 38. In this way, when the pole support is placed on an uphill or downhill angle relative to a level position, the pole mounting rail member can then be moved so as to be in an upright and level position for supporting a camera, a light, communications equipment or other items upon the pole 55. In one embodiment of the present invention, an externally threaded bolt is secured to (by welding, for example) and extends from rail member 40 through pole guide and support member 30, and the locking knob 48 includes a neck that is internally threaded so as to receive the threaded bolt. In this way, the bolt is permanently extended through the arcuate slit 38 and the rail member is in constant engagement with the pole guide and support member 30 as a result.

Figure 6:
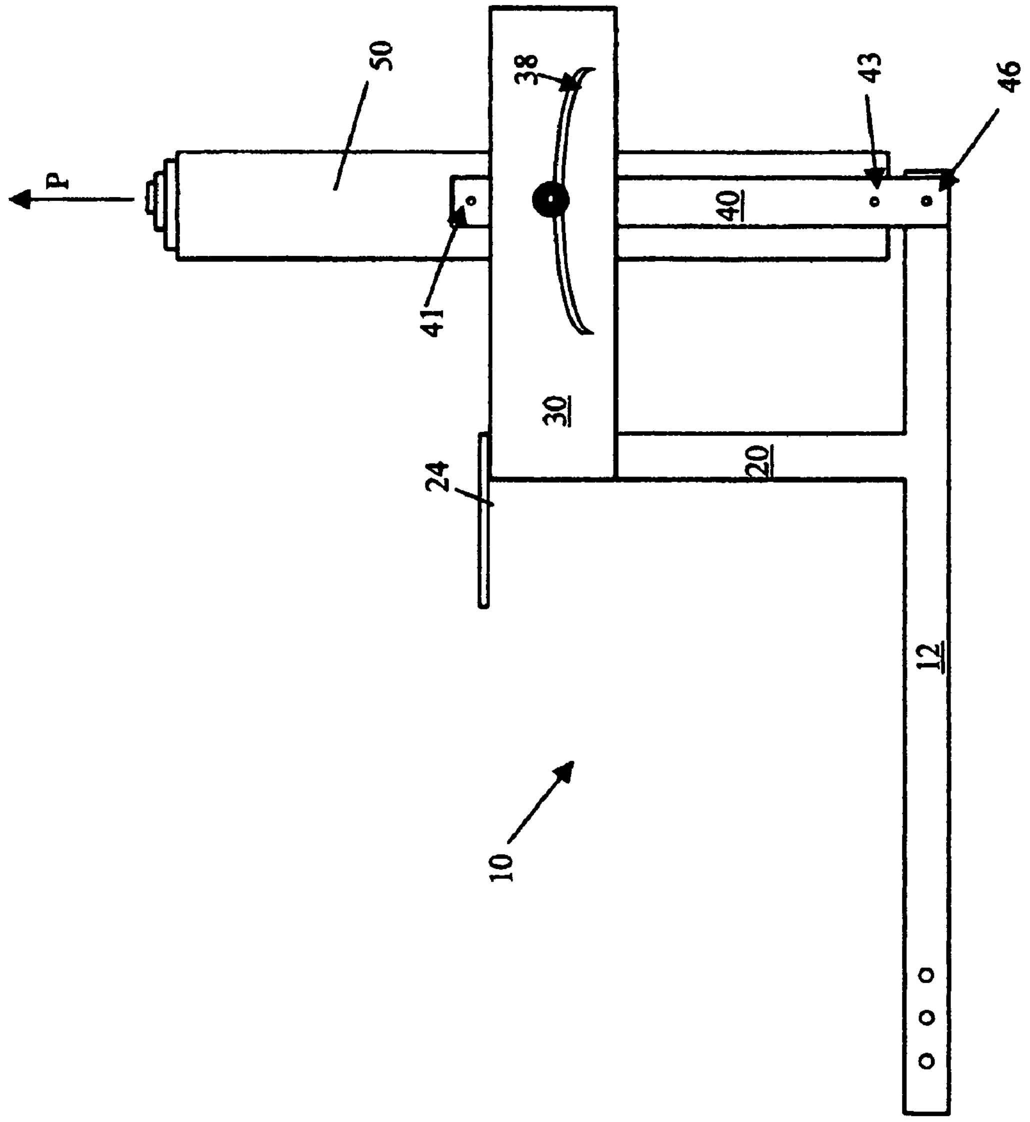
FIG. 6 is a front schematic view of an alternative embodiment of the present invention showing a pole member secured thereto.

In one embodiment of the present invention, a bubble level 60 can be temporarily mounted to the pole 55 so as to ensure the pole is maintained at a level position as shown in FIGS. 1 and 11. The bubble level 60 can be mounted as part of a stabilizing attachment 62 which includes straps 64 for maintaining secure connection to the pole 55. In the event a telescoping pole 55 is employed, as shown in FIG. 6, for example, a pneumatic pump (not shown) or other means for powering the raising and lowering of the pole can be employed. The pump may be hand operated, stored compressed air, electrically powered or have other means to raise the pole. In one embodiment of the present invention, the pump is mounted to the pole base 50 on the side of the pole that is opposite the pole mounting rail member 40. In another embodiment, the pole can be raised section by section, utilizing an appropriate locking method to lock each section in place as it is raised.

The knob 48 and slit 38 within the midsection 36 of the pole guide and support member 30 limit the pivoting movement of the pole mounting rail member 40. It will be appreciated that other elements, such as a retaining bar, latch, lever and cam, or chain and hooks ratcheting connection or other suitable device can be used to maintain the position of the pole mounting rail 40, relative to the pole guide and support member 30. These will act to limit the pivoting movement of the pole mounting rail member 40. Still other elements, such as one or more block members mounted to the back face of the midsection 36 of the pole guide and support member can limit the pole mounting rail member's pivotability. The slit 38 creates a continuous range of available locking points that can be used to limit the pivoting movement of the pole mounting rail member 40. Other mechanisms employed in accordance with the present invention to limit the pivoting movement of the pole mounting rail member can either be non-discrete as with the slit, or discrete whereby a certain number of settings can be incrementally used to increase or decrease the angle at which the rail member 40 extends from the base support member 12.

Figure 2:
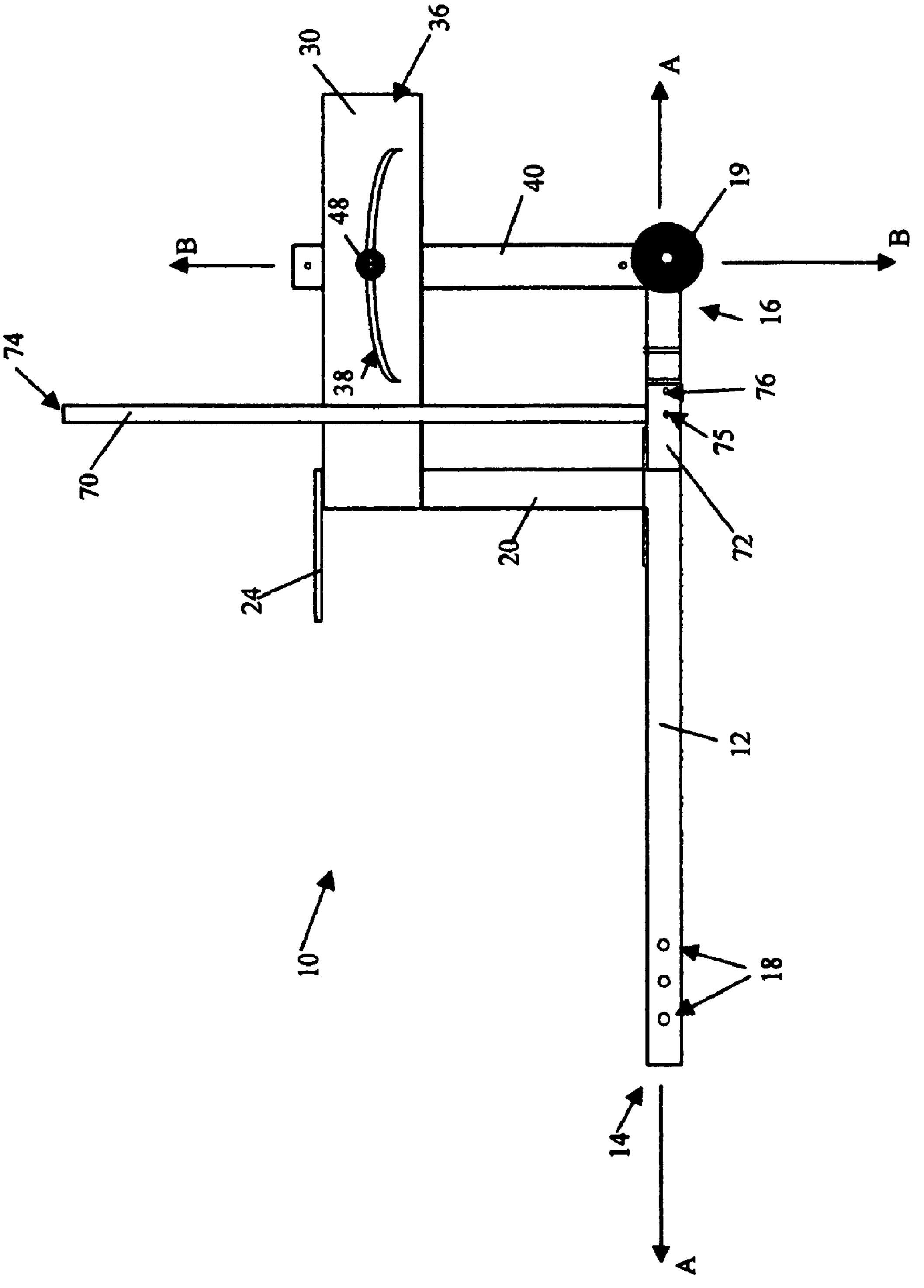
FIG. 2 is a front schematic view of the device of FIG. 1, shown without pole member and leveling apparatus, and with a stabilizer support and guide member.
Figure 7:
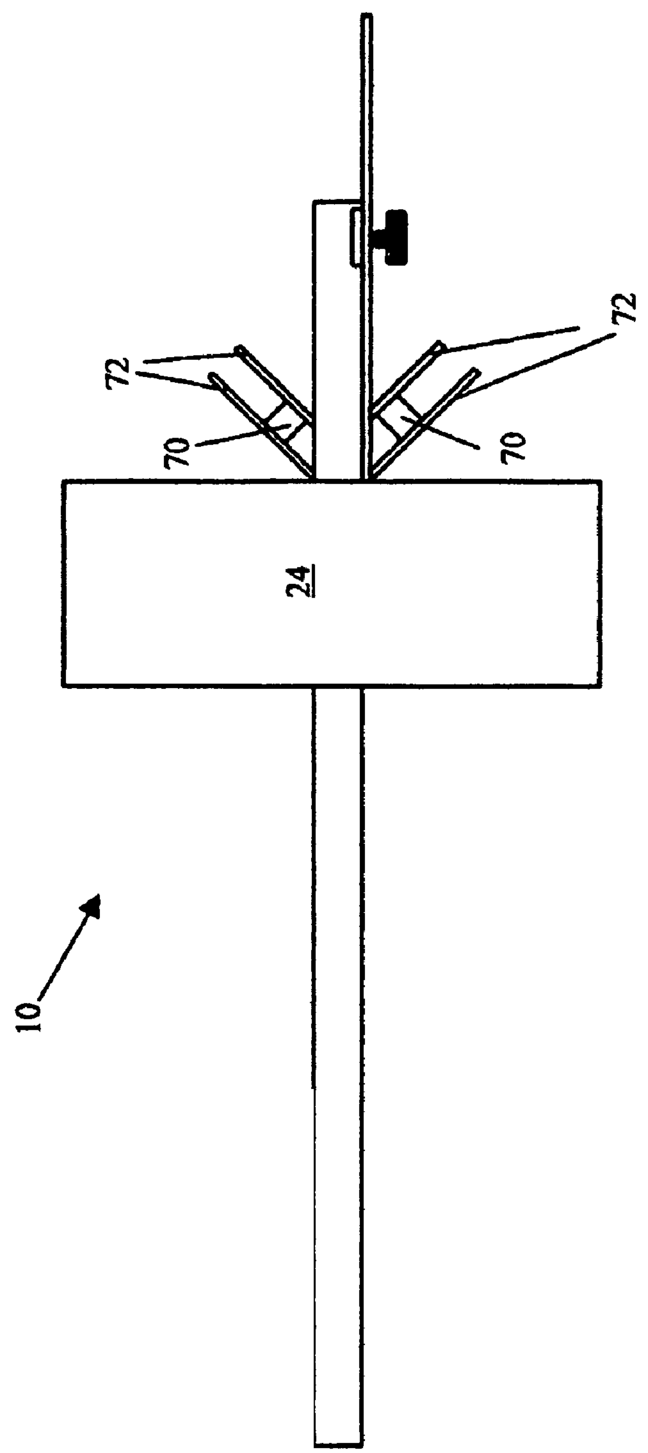
FIG. 7 is a top plan schematic view of particular elements of the device of the present invention shown in FIG. 1.

In one embodiment, as shown in FIGS. 2 and 7, for example, one or more stabilizers 70 can be provided to help stabilize and support the device and any pole or other element mounted thereto. In one embodiment of the present invention, the stabilizers 70 are collapsible and capable of folding out to an extended, full support position. Stabilizer support plates 72 can be connected to the base support member 12 as shown in FIGS. 2 and 7 to help guide the stabilizers 70 during operation. Stabilizers 70 can be employed in a variety of deployments, such as, for example, when no vehicle is available to receive the feed end 14 of the base support member 12. In such a case, the feed end 14 and the top ends 74 of the stabilizers 70 can act as the feet of a tripod to stabilize the ground support for the present invention. The stabilizers 70 are pivotable about a shaft member 75 secured within the stabilizer support plates 72. It will be appreciated that the stabilizer(s) can be used in conjunction with a single pole, a telescopic pole or a combination of poles. It will further be appreciated that the guide can be provided with a locking mechanism 76 allowing the stabilizer to be locked in the desired position. In another embodiment of the present invention, one or more removable type stabilizers can be bolted to the support members to provide stability for the device 10. In yet another embodiment of the present invention, the device 10 can be bolted or attached to a separate free-standing stabilizing base, which can be foldable or otherwise manipulated so as to be easily transportable. In one embodiment of the present invention, one or more of the stabilizers 70 can be provided with weights attached to the ends thereof, or openings that allow one or more spikes to extend therethrough and into the ground, so as to assist in providing stability to the device. One of ordinary skill in the art will appreciate that there are myriad other ways in which the device of the present invention can be stabilized.

Figure 3:
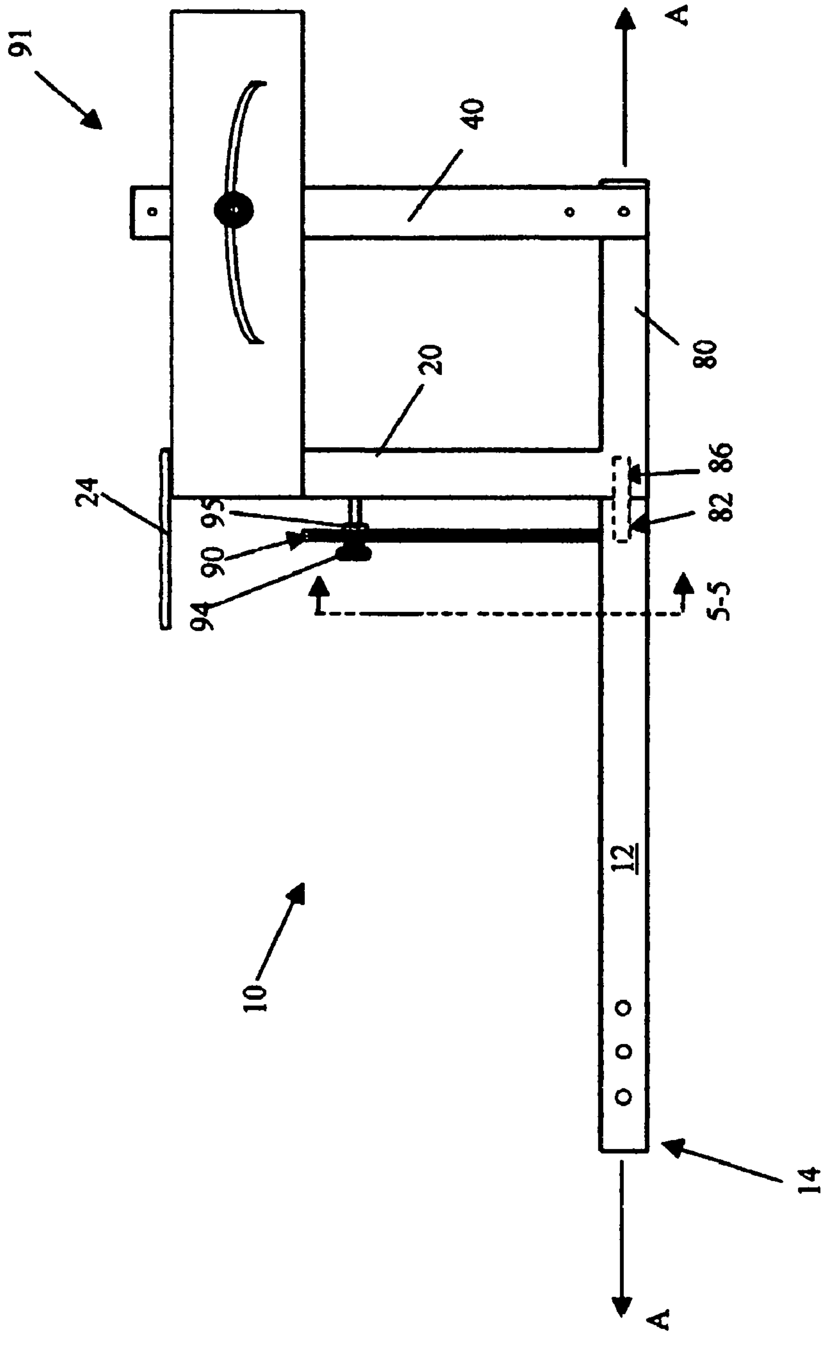
FIG. 3 is a front schematic view of an alternative embodiment of the device of the present invention, showing a secondary support plate and pivot shaft member coaxial to base support member.
Figure 5:
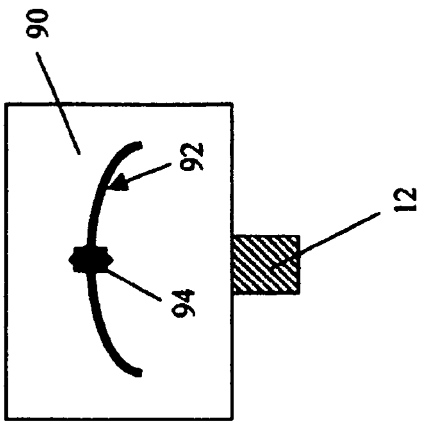
FIG. 5 is a left side view in partial cross-section of the device shown in FIG. 3, taken along the line 5-5 of FIG. 3.
Figure 4:
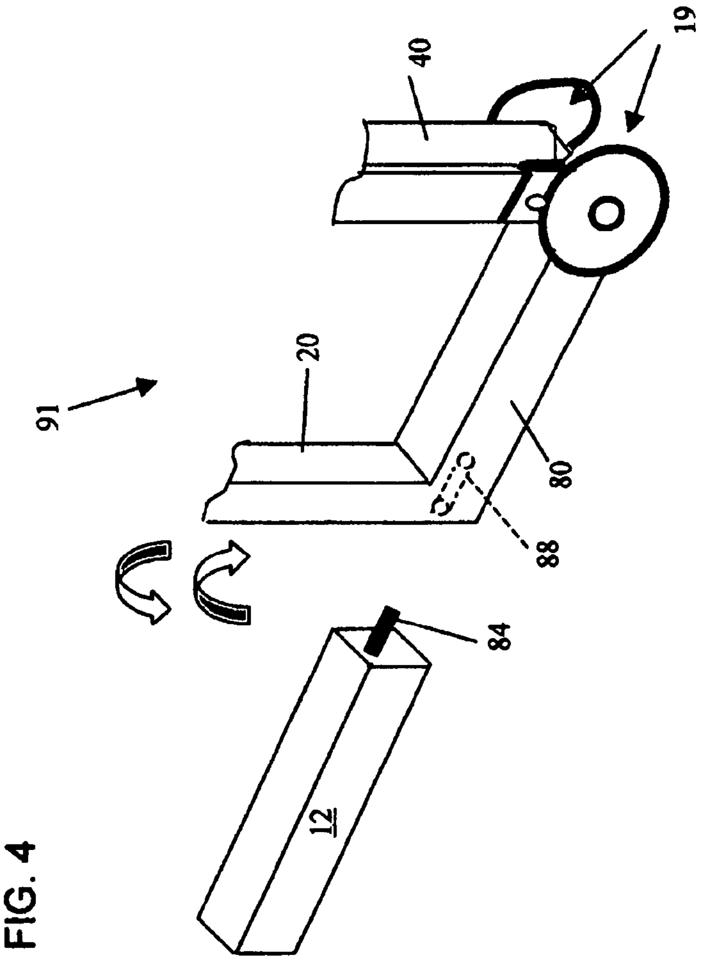
FIG. 4 is a schematic perspective view of components of the device shown in FIG. 3, with components being broken away.

FIGS. 3 through 5 illustrate the embodiment of the present invention incorporating an additional pivot shaft and locking mechanism to facilitate lateral movement and adjustment of the pole support in other desired positions. As shown therein, the base support member includes a primary portion 12 and a supplementary portion 80. The primary portion 12 includes a feed end 14 as in FIG. 1, but the supplemental base member portion 80 and tube member 20 rotate as one unit with respect to support member 12. This rotation is about shaft 84, which is substantially coaxial with axis A.

As shown in FIGS. 3 and 4, one end 82 of a shaft 84 can be mounted in a pre-drilled opening in base support member 12, while the other end 86 of the shaft 84 can be mounted in a pre-drilled opening 88 in base member supplementary portion 80. This permits rotation of the support tube member combination 91 (support tube member, base member supplementary portion and pole mounting rail member) in both directions as indicated by the arrows shown in FIG. 4. It will be appreciated that, while the base support member 12, support tube member 20 and pole mounting rail member 40 may be fashioned using hollow metal materials so as to be sturdy, yet lightweight, the present invention can incorporate fully solid metal parts, or a combination of solid metal and hollow metal parts. For purposes of casting and/or drilling openings as described above for receiving the shaft 84, the present invention can either incorporate solid metal parts or can infuse ballast material into a portion of the hollow openings of these elements so as to allow for creating the smaller shaft cavity. Separately, it will be appreciated that the present invention can incorporate other methods of providing pivoting connections described above, such as through ball joints, for example.

A secondary support plate 90 is mounted to the base support member 12 as shown in FIGS. 3 and 5. While shown atop base support member 12 in FIG. 5, the secondary support plate 90 can also straddle the base support member for added stability. Further, the secondary support member can take shapes other than rectangular as shown in FIG. 5. The support plate 90 can be positioned substantially perpendicular to the base support member 12 and is provided with a generally arcuate slot 92 which can allow a threaded bolt 94 or other similar element (e.g., lock knob) to pass through. The end of the threaded bolt 94 can cooperate with a locking nut 95 and/or an opening in the support tube member 20 to provide a solid locking engagement such that the support tube member combination 91 cannot change position relative to the support plate 90. Once the threaded bolt is unthreaded from the support tube member (or lock knob is loosened, for example), the support tube member combination 91 can then rotate within the range of the arcuate slot 92. Since the shaft member 84 is mounted coaxially with the axis A of the base support member, the support tube member combination can thereby rotate side-to-side in a plane substantially perpendicular to axis A.

Thus, in this embodiment of the present invention, the pole support can move toward and away from the base support member as well as side to side around the base support member. This arrangement allows for adjustment of the pole orientation in multiple dimensions to accommodate more sophisticated types of terrain. For example, if a vehicle and appropriate hitch are provided for use with the present invention, and the vehicle is parked directly up or down a hill, the embodiment of the present invention in FIG. 1 may be used to orient a pole in a substantially vertical and level position. On the other hand, if the vehicle is not parked directly uphill or downhill, but rather at an angle, then the embodiment of the present invention in FIGS. 3-5 would be employed to achieve substantially vertical pole orientation.

Figure 8:
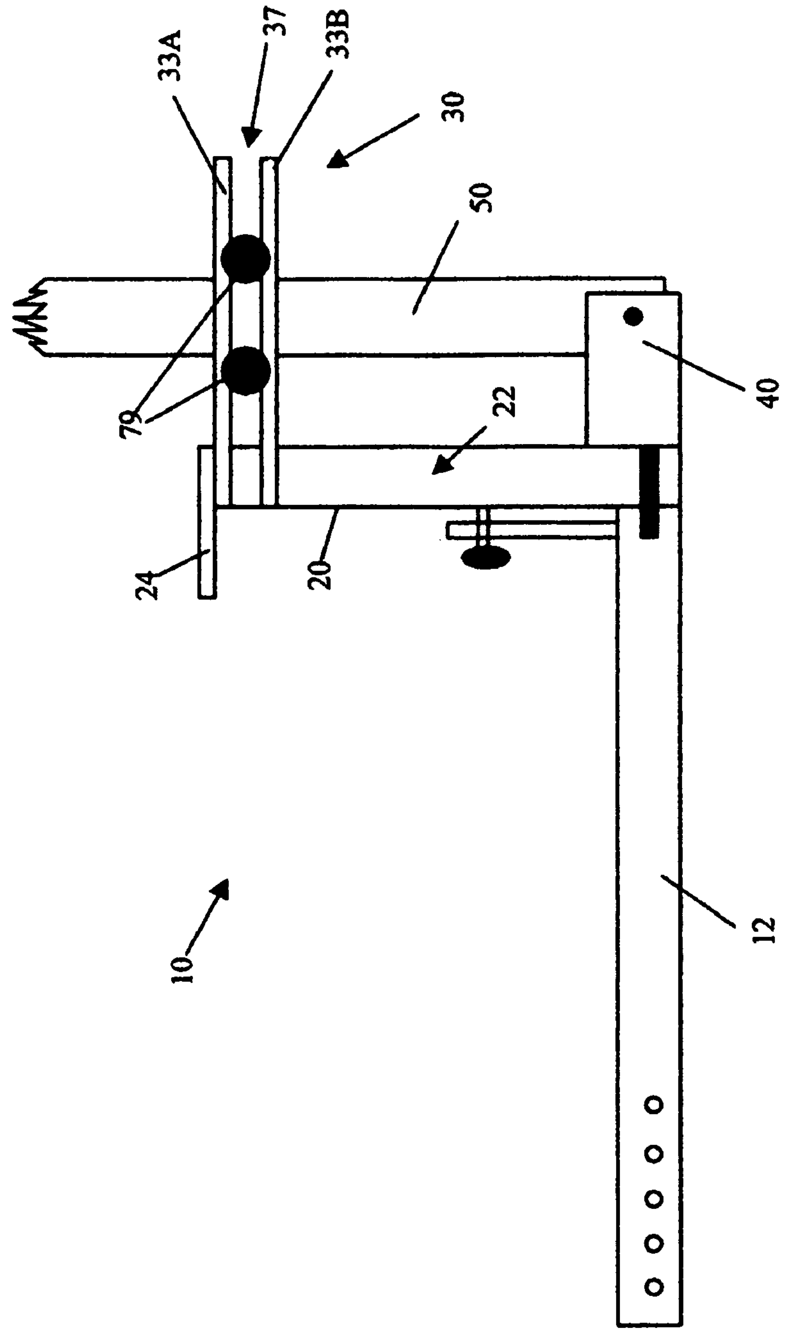
FIG. 8 is a front schematic view of an alternative embodiment of the present invention.
Figure 9:
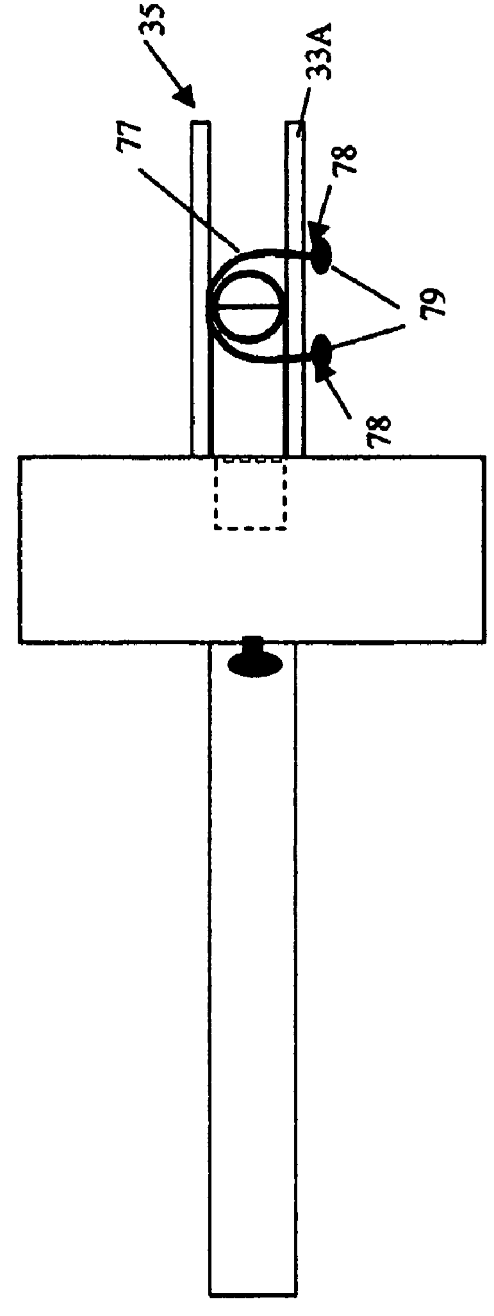
FIG. 9 is a top plan schematic view of the device shown in FIG. 8.

FIGS. 8 and 9 illustrate an alternative embodiment for securing the pole and/or pole base 50 to the pole guide and support member 30. As shown therein, the pole guide and support member 30 comprises at least one pair of pole backing guide rails 33A and 33B secured to the front side 22 of the support tube member 20 in substantially parallel relation and forming a gap 37 therebetween. A second pair of pole backing guide rails (indicated at 35 in FIG. 9) can be provided and secured to a back side of the support tube member 20. A substantially U-shaped collar member 77 extends around the pole 55 being mounted, with the two ends 78 of the collar member extending through the gap 37 and secured to the pole guide and support member 30 by appropriate locking members 79. In the instance of this embodiment where a second pair of guide rails 35 is employed, the U-shaped collar member 77 may extend into the corresponding gap at or near the bottom of the "U" for additional support and more proper alignment in order to limit unnecessary wear on either the collar member 77, the pole or the locking mechanisms. The ends 78 can be provided with threads in one embodiment of the present invention, and the lock knobs can have threaded openings to enable mounting about the threaded ends 78. In another embodiment of this version of the invention, a first end of the collar is provided with a washer and nut combination on the other side of member rails 33A and 33B from the lock knob. When the lock knob extends through the washer and tightens against the nut, it thereby secures the collar member 77 to the rails. The second end of the collar is provided with an externally threaded neck and a lock knob with internal threads so that the second end pulls the pole to the rail members. As shown in FIG. 8, the pole mounting support plates 40 can be secured directly to the support tube member 20.

Figure 10:
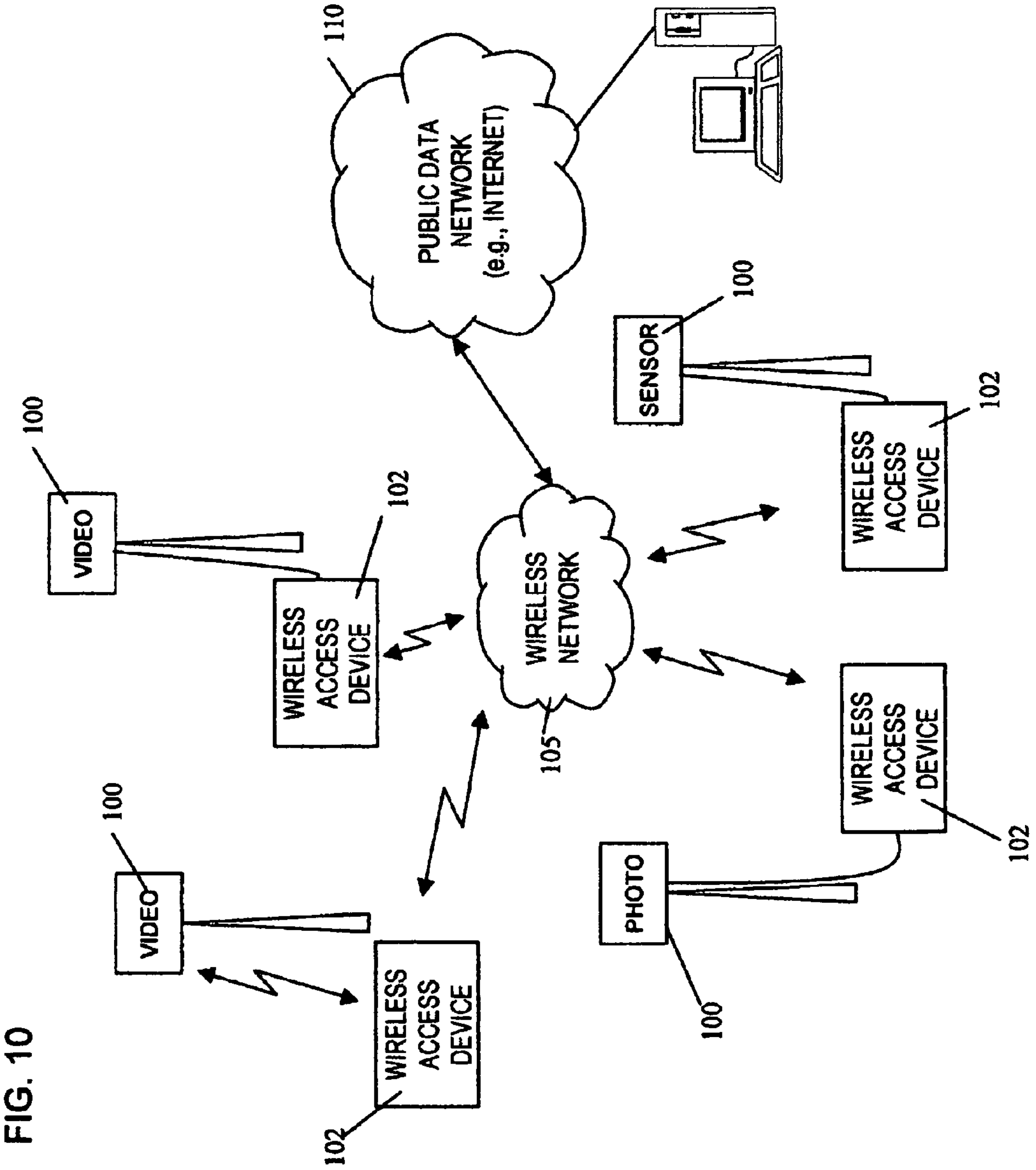
FIG. 10 is a diagram of a surveillance system implemented using the pole support system, in accordance with one embodiment of the invention.

The pole mounting system of the present invention can be employed within a wide-area remote surveillance and/or sensing system according to one implementation of the present invention. As shown in FIG. 10, for example, multiple visual and other sensing systems 100 (both wired and wireless, as well as photographic, video imaging and sensing devices (e.g., wind speed, wind direction, precipitation sensors, temperature sensors, radar, etc.)) utilize a wireless access device 102 to communicate with a wireless network 105. In the wireless video camera system, the video camera atop the pole support system can be controlled by wireless or wired means as is known in the art The wireless network 105 can be any type of communication network, such as a cellular network, satellite, cable, fiber optic, wireless local area network (LAN), metropolitan area network (MAN), wide area network (WAN), etc. An appropriate wireless access device is employed depending on the particular wireless network and technology. The wireless network can be provided with connectivity to a public data network 110 (e.g., the Internet), thereby permitting a remote host to control the surveillance system, which comprises the various video, photo and sensing systems. Remote control can be provided through conventional means, such as, for example, keyboard, mouse, touchscreen and/or voice-activated controls, for example.

In addition to controlling the systems mounted to the poles, remote direction programming can be provided in accordance with the present invention for directing the motion and alignment of the positional elements described above (e.g., the pole guide and support member, the lock knobs, the pole mounting rail member, the stabilizers, etc.). In this embodiment, automatic pole leveling components can be provided in the form of a level sensor, gyroscope or other similar device that sends a signal to mechanical (e.g., worm gear or acme screw type), pneumatic and/or hydraulic actuators to move the pole. In one embodiment of the present invention, a camera can provide remote images of a bubble level to enable the remote user to manually and remotely adjust the positioning of the pole support elements. Accordingly, the present invention can be remotely functional and capable of maintaining in a level position in environments where the terrain may change over time (e.g., mud that gets wet may sink portions of the support, requiring adaptation to get the pole back to level). In another example, when the device 10 is affixed to a vehicle, remote leveling of the pole can be accomplished remotely from within the vehicle.

The processes described herein for providing the surveillance system may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Embodiments of the present invention are not limited to any specific combination of hardware circuitry and software.

The present invention can be powered by fuel cell, solar power or more traditional power sources. The present invention can further incorporate a secondary safety mechanism to prevent unwanted pole movement. The present invention can further incorporate an anti-tamper system (e.g., electric shock, chemical, audible) to prevent abuse of the system when free standing without on-site personnel.

It will be well understood that the present invention can have, but is not limited to, many potential applications to a variety of real-world problems, including border security, perimeter patrol (e.g., for a prison or secured access area), gunfire detection, thermal imagery, sporting event videos and/or photography, crime detection, general (e.g, traffic) and specific (e.g., illegal hunting) law enforcement activities, for example.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

The invention claimed is:

1. A pole mounting system for assisting in remote sensing, comprising:

a base support member having a feed end and a pole mounting end;

a support tube member secured to the base support member at a position between the feed end and pole mounting end, and extending substantially perpendicular to the support tube member;

a pole mounting rail member pivotably secured to the base support member proximate the pole mounting end;

a pole guide and support member fixedly secured to the support tube member and movably secured to the pole mounting rail member;

at least one pole mounted camera having communication means for communicating images recorded by the camera to a remote computer, with the pole being secured to the pole guide and support member; and remote direction programming for directing movement of the camera.

2. The pole support of claim 1, wherein the pole guide and support member is substantially parallel to the base support member.

3. The pole support of claim 1, wherein the pole mounting rail member is pivotably secured to the base support member so as to be capable of pivoting about an axis that is perpendicular to the base support member.

4. The pole support of claim 1, wherein the pole guide and support member includes means for limiting pivot movement of the pole mounting rail member.

5. The pole support of claim 4, wherein the means for limiting pivot movement of the pole mounting rail member includes a locking mechanism.

6. The pole support of claim 4, wherein the means for limiting pivot movement of the pole mounting rail member includes a wall section defining an arcuate cavity therein, and a locking mechanism extending through the cavity and into the pole mounting rail member.

7. The pole support of claim 4, wherein the pole guide and support member comprises a pair of pole backing guide rails secured to a first side of the support tube member in substantially parallel relation and forming a gap therebetween, and wherein the means for limiting pivot movement includes a substantially U-shaped collar member that extends around a pole being mounted and through the gap, and a pair of locking knobs each having a diameter exceeding the gap width and each capable of cooperatively engaging an end of the collar member so as to securely tighten the pole backing guide rails against a pole being mounted.

8. The pole support of claim 1, wherein the pole mounting rail member is capable of securely engaging a pole, wherein the support tube member has a top surface and wherein a platform is secured atop the support tube member top surface.

9. The pole support of claim 1, further including at least one stabilizer guide member secured to the base support member, and a stabilizer member secured to the at least one stabilizer guide member.

10. The pole support of claim 1 wherein the support tube member is fixedly secured to the base support member.

11. The pole support of claim 1 wherein the base support member comprises a primary portion and a supplementary portion, wherein the pole mounting rail member is secured to the base support member supplementary portion and wherein the support tube member is pivotably secured to the base support member primary portion.

12. The pole support of claim 1 further including a secondary support plate member secured to the base support member and extending substantially perpendicularly therefrom, the support plate member defining an arcuate opening therein, and a second locking knob extending through the arcuate opening and cooperatively engaging the support tube member, whereupon the locking knob can travel throughout the length of the arcuate opening and lock the support tube at a position thereupon.

13. A method for constructing a pole support for remote sensing, comprising the steps of:

providing a base support member having a feed end and a pole mounting end;

providing a support tube member secured to the base support member at a position between the feed end and pole mounting end, and extending substantially perpendicular to the support tube member;

providing a pole mounting rail member pivotably secured to the base support member proximate the pole mounting end;

providing a pole guide and support member fixedly secured to the support tube member and movably secured to the pole mounting rail member;

providing at least one pole mounted camera having communication means for communicating images recorded by the camera to a remote computer, with the pole being secured to the pole guide and support member; and providing remote direction programming for directing movement of the camera.

14. The method of claim 13 wherein the step of providing the pole guide and support member includes providing means for limiting pivoting movement of the pole mounting rail member in a range of continuous positions.

* * * * *